United States Patent [19]
Buchanan et al.

[11] Patent Number: 5,582,428
[45] Date of Patent: Dec. 10, 1996

[54] HYBRID ADAPTIVE INFLATOR FOR AIRBAGS

[75] Inventors: Eric S. Buchanan, North Ogden; Bradley W. Smith, Ogden; Mark B. Woodbury, North Salt Lake, all of Utah

[73] Assignee: Morton International, Inc., Chicago, Ill.

[21] Appl. No.: 651,010

[22] Filed: May 20, 1996

Related U.S. Application Data

[63] Continuation-in-part of Ser. No. 608,356, Feb. 28, 1996, abandoned.

[51] Int. Cl.$^6$ .................................................. B60R 21/26
[52] U.S. Cl. .......................... 280/741; 280/736; 280/737; 222/3
[58] Field of Search ...................... 280/741, 736, 280/737; 222/3; 102/530, 531; 422/166

[56] References Cited

U.S. PATENT DOCUMENTS

| | | | |
|---|---|---|---|
| 3,689,105 | 9/1972 | Matsui et al. | 222/3 X |
| 3,726,649 | 4/1973 | Delham | 222/3 |
| 3,796,441 | 3/1974 | Föhl | 222/3 X |
| 4,512,355 | 4/1985 | Galbraith | 222/3 X |
| 5,031,932 | 7/1991 | Frautom et al. | 280/741 |
| 5,060,973 | 10/1991 | Giovanotti | 280/736 |
| 5,078,422 | 1/1992 | Hamilton et al. | 280/736 |
| 5,351,988 | 10/1994 | Bishop et al. | 280/737 |
| 5,360,232 | 11/1994 | Lowe et al. | 280/741 |
| 5,536,040 | 7/1996 | Cuevas et al. | 280/737 |

*Primary Examiner*—Christopher P. Ellis
*Attorney, Agent, or Firm*—Taylor J. Ross; Gerald K. White

[57] ABSTRACT

A hybrid adaptive airbag inflator. The inflator includes two separate chambers, each containing a quantity of stored inert gas. Each chamber additionally includes a heating device to heat the stored gas. To provide adaptive performance, one, or the other, or both of the heating devices may be fired, depending upon the severity of the collision. The heated stored gas increases in pressure and breaks free of the chamber to inflate the cushion. The two chambers are preferably provided with restricted gas communication, to equalize pressure between the chambers over time. This restricted communication maintains the chambers essentially separate over the short time periods associated with inflation. Over time, however, the communication will permit any unfired chamber to depressurize, providing increased safety.

13 Claims, 2 Drawing Sheets

HYBRID ADAPTIVE INFLATOR FOR AIRBAGS

CROSS-REFERENCE TO RELATED INVENTIONS

This application is a continuation-in-part of U.S. Ser. No. 08/608,356, filed Feb. 28, 1996, now abandoned having the same title and inventors, and bearing attorney docket no. 3046-21-00, which is included herein by reference.

BACKGROUND OF THE INVENTION

1. Field of the Invention

The present invention relates in general to passive restraint airbag systems. In particular, the present invention relates to an improved hybrid inflator for airbag systems providing adaptive performance.

2. Description of the Related Art

In airbag systems there is typically a cushion which, upon a collision, is inflated to provide protective cushioning to the passenger. To inflate the cushion such systems employ an inflator to produce a quantity of inflation gas. Various inflators operating upon different principles are known. For each operating principle, there is a slight difference in performance such as the rise and fall of pressure in the cushion over time. As such, for different applications, inflators operating on different principles are preferred.

One known class of inflator is referred to as hybrid. In hybrid inflators, there is a pressure vessel containing a quantity of pressurized inert gas. To fill a cushion simply with stored gas would required a large quantity of the gas, resulting in a large inflator. To reduce size and weight, hybrid inflators exploit the principle that the pressure of a gas increases with temperature. Therefore, hybrid inflators include various types of heaters which heat the gas before it is released from the inflator. This permits a lesser quantity of gas to be stored, greatly reducing inflator size.

Even with this size reduction, hybrid inflators have typically been rather large. As such, they have typically been used for passenger protection, where relatively large spaces are available behind the vehicle dashboard to store the inflator. Providing a hybrid inflator which is sufficiently small to be mounted to a steering wheel for driver side protection has been more difficult.

Additionally, there has been a growing desire to provide adaptive airbag systems. Adaptive systems tailor airbag performance to various criteria, such as ambient temperature (which affects gas pressure as noted above), severity of the collision, position of the passenger, etc. As an example, an adaptive airbag system could sense whether the collision is moderate or serious. If the collision is moderate, a lesser quantity of gas is used to inflate the cushion. If the collision is serious, a greater quantity of gas is used, providing a "harder" cushion to provide the increased protection required.

While such adaptive systems are desirable, they typically require additional components on the inflator, increasing its size. As such it has been even more difficult to provide an adaptive hybrid inflator which will meet the size requirements for vehicles, especially for driver side applications.

SUMMARY OF THE INVENTION

An object of the present invention is to provide an adaptive hybrid inflator which reliably provides gas to a protective cushion.

Another object of the present invention is to provide such an inflator having a small size, to reduce the space occupied by the inflator in the vehicle cabin.

Yet another object of the present invention is to provide such an inflator which is sufficiently small for use mounted upon a steering wheel for driver side protection.

These and other objects are achieved by a hybrid adaptive airbag inflator. The inflator includes two separate chambers, each containing a quantity of stored inert gas. Each chamber additionally includes a heating device to heat the stored gas. To provide adaptive performance, one, or the other, or both of the heating devices may be fired, depending upon the severity of the collision. The heated stored gas increases in pressure and breaks free of the chamber to inflate the cushion. The two chambers are preferably provided with restricted gas communication, to equalize pressure between the chambers over time. This restricted communication maintains the chambers essentially separate over the short time periods associated with inflation. Over time, however, the communication will permit any unfired chamber to depressurize, providing increased safety.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
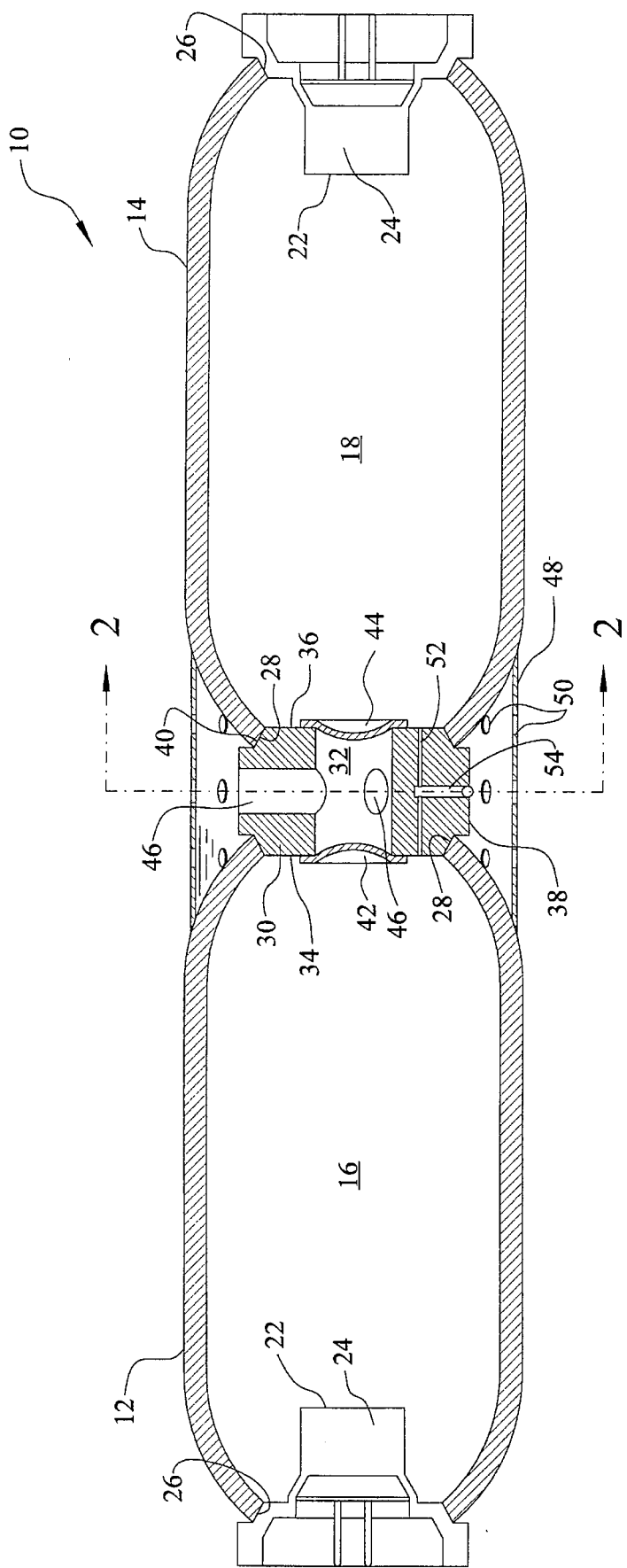
FIG. 1 is a cross-sectional side view of an inflator according to a first embodiment of the invention.
Figure 2:
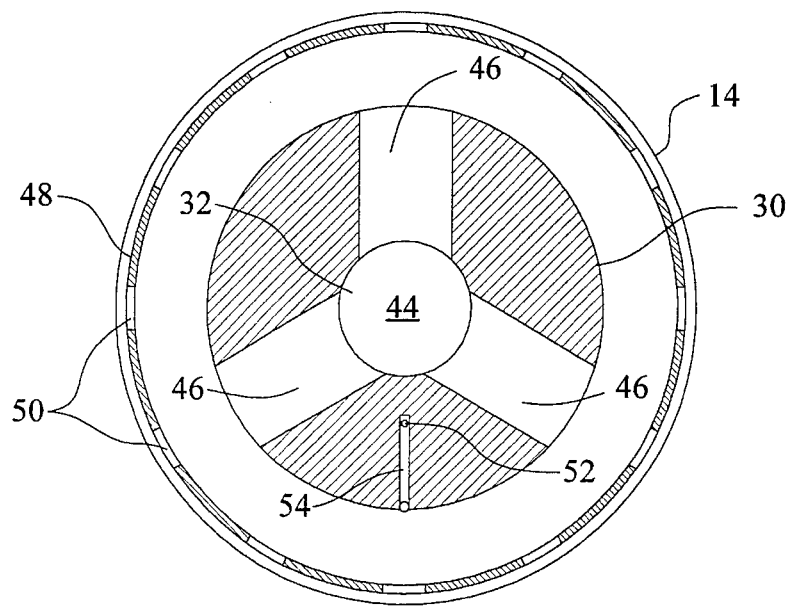
FIG. 2 is a cross-sectional view along line 2—2 of FIG. 1.

With reference to FIG. 1, a first embodiment of an inflator according to the present invention is generally designated by reference numeral 10. The inflator 10 includes first and second pressure vessels 12 and 14, respectively. While various forms are possible, such a spherical, etc., it is preferred that each of the vessels have a generally cylindrical shape.

Each of the vessels 12 and 14 forms a chamber 16 and 18, respectively. These chambers will each hold a quantity of stored inert gas. The quantity in each chamber may be equal, or may be unequal. If unequal quantities are employed, these chambers may be of different size or shape to accommodate the different quantity. As made clear below, it is preferred that the pressure in each chamber be equal over time, and as such, unequal pressures are not preferred for providing the different quantities of gas.

Each chamber will include a heating device 22. The heating device may take various forms. It is preferred that the heating device be formed by a pyrotechnic initiator 24, mounted in an appropriate mounting hole 26 in the wall of the pressure vessel. Other devices, such as self contained fluid fueled heating devices, could also be employed. As with the quantities of gas, the size, and more particularly heat output, of the two heating devices may be equal or unequal.

Each of the pressure vessels will also include an exit orifice 28, which provides communication to the associated chamber. Both exit orifices are placed in communication with a common connector 30. In the preferred embodiment, the connector 30 takes the form of an annular connecting ring having a central cavity 32 extending along a longitudinal axis, first and second longitudinal ends 34 and 36, respectively, and an outer periphery 38. The connecting ring mounts the pressure vessels such that they are oriented with the two exit orifices in spaced, opposed relation.

As shown, the first and second pressure vessels are mounted to the first and second longitudinal ends, respectively, of the connecting ring, with the exit orifice of each pressure vessel communicating with the central cavity. This mounting may be achieved by securing the vessels to the connecting ring by fasteners or adhesive, but to ensure a secure mounting when pressurized, it is preferred that the vessels be welded to the connecting ring about the exit orifices. Further, to provide a more secure seal, the longitudinal ends of the connecting ring may be provided with a peripheral shoulder 40 against which the wall of the pressure vessel rests.

As may be seen, the central cavity 32 of the connecting ring may communicate with both chambers. To prevent unintended simultaneous communication, and thus retain the adaptive capabilities described below, the first and second pressure vessels are provided with first and second burst discs 42 and 44, respectively. Each burst disk blocks communication between the associated chamber and the central cavity to seal the associated chamber against escape of the inert gas. As is known in the art, the burst disks are designed such that they will fail above a predetermined pressure in the associated chamber, as described more fully below.

As shown, the burst discs may be mounted upon the longitudinal ends of the connecting ring 30, in covering relation to the central cavity. Alternative arrangements are also possible. For example, the burst discs could be mounted over the exit orifice of the pressure vessel.

As may be envisioned, upon failure of either of the burst discs the gas from the pressure vessel(s) will communicate with, or flow into, the central cavity of the connecting ring. To permit this gas to leave the inflator and enter the cushion, the connecting ring is provided with one or more exit ports 46 extending from the central cavity 32 to the outer periphery 38. In the embodiment shown, three exit ports are provided at equal circumferential spacings about the central cavity. To further disperse the flow of gas, there may additionally be provided a diffuser 48. The diffuser may advantageously take the form of a cylindrical section extending between the pressure vessels to encompass the connecting ring 30. The diffuser will include numerous diffuser ports 50 through which the gas may flow.

In operation, the two heating devices 22 will be connected to a controller (not shown) which produces appropriate signals upon sensing a collision. Depending upon the severity of the collision (or other factors such as the position of the passenger in the seat), the controller will cause one or both of the heating devices 22 to activate. The activation of the heating devices causes the inert gas stored in the associated chamber to reach a much higher temperature. As noted above, the pressure of a gas increases with temperature, and as such the pressure of the stored inert gas is increased.

This increase in pressure is sufficient to cause the associated burst disc to fail, permitting the heated inert gas to pass into the central cavity of the connecting ring, and out through the exit ports to the cushion. As noted, the controller activates one or both of the heating devices, depending upon the severity of the collision. In this manner the amount of gas fed to the cushion may be varied, to inflate the cushion to varying "hardness".

Specifically, if only one of the heating devices is activated, only half of the stored gas is fed to the cushion. This would correspond to a moderate collision. Alternatively, if both heating devices were activated, twice as much gas, and the entire amount of stored gas, would go to the cushion. This would of course correspond to a severe collision. Furthermore, the heating devices may be activated at the same time, or with slight time delays, to create different pressure levels over time in the cushion.

The above description assumes that the two pressure vessels each store the same quantity of gas, and that the heating devices produce the same amount of heat. As may be recalled, this is not required. For example, the first pressure vessel may comprise 70% of the total gas volume, and the second pressure vessel comprise 30% of the total volume. Alternatively or additionally, the heating devices may produce different amounts of heat, and thus raise the associated gas to different pressure levels. Using either or both of these methods, it may be seen that the inflator 10 may be modified for various different applications, and in these applications provide a wide variety of outputs.

To complete the inflator, all that is needed is a fill valve, as is commonly known (and even this could be eliminated if the inflator were assembled in a pressurized environment). For the inflator described to this point, one such fill valve would be provided for each pressure vessel. However, an advantageous modification of this inflator permits the use of a single fill valve, and also provides further features.

Specifically, it is preferred that the connecting ring 30 be provided with a restricted flow channel 52 extending between the longitudinal ends of the ring, such that the two chambers 16 and 18 are in restricted flow communication. By restricted flow communication, it is meant that over long periods of time, on the order of ten seconds or more, sufficient flow occurs that the pressure in each chamber is equal. This advantageously permits the use of only one low pressure detector (indicating a leak of the pressurized gas) for both chambers. While the pressure equalizes over time, the flow is sufficiently restricted such that for short periods of time, on the order of approximately eighty milliseconds or less (and at a minimum the amount of time the inflator will operate to inflate the cushion), differences in pressure may occur between the two chambers. Stated differently, over short periods of time the gas flow and resultant pressure change between chambers will be negligible.

This may be achieved simply by forming the channel 52 as a very small diameter hole between the ends of the ring 30. With the channel 52 present, it is noted that the operation of the inflator described above will not change. Specifically, if a single heating device is activated, the resultant increase in gas pressure will cause the associated burst disk to fail and the gas to escape before any appreciable amount of this increased pressure transfers to the other chamber. While the inflation operation is not altered, this arrangement does provide an advantageous result subsequent to operation.

Specifically, after the gas has escaped from a single chamber activation, the activated chamber will be open to atmosphere, and thus be at atmospheric pressure. While the remaining chamber did not have an appreciable change in pressure over the short time needed to inflate the cushion, over the longer time periods this pressurized gas will leak through the channel 52 into the atmosphere. As such, the remaining chamber will depressurize automatically, eliminating any danger that such pressurized tanks pose.

A further advantage to the channel 52 is filling of the chambers with the gas. As noted, two fill valves would normally be required for the two chambers. However, the two chambers may both be filled via the channel 52 by providing a fill valve 54 which communicates with the channel. It is noted that the channel is a restricted flow channel, and as such the filling process may be prolonged. However, the cost and weight of an additional fill valve is eliminated.

From the above description it may be seen that the inflator 10 provides a hybrid adaptive inflator having the advantages of a wide variety of output, increased safety after used due to depressurization, and reduced cost by use of a single fill valve, single exit and single diffuser. While the inflator 10 enjoys these advantages, it still suffers from a relatively large size. As such, while this inflator would be well suited to passenger side applications, it would not normally be suitable for mounting to a steering wheel for driver side use.

Figure 3:
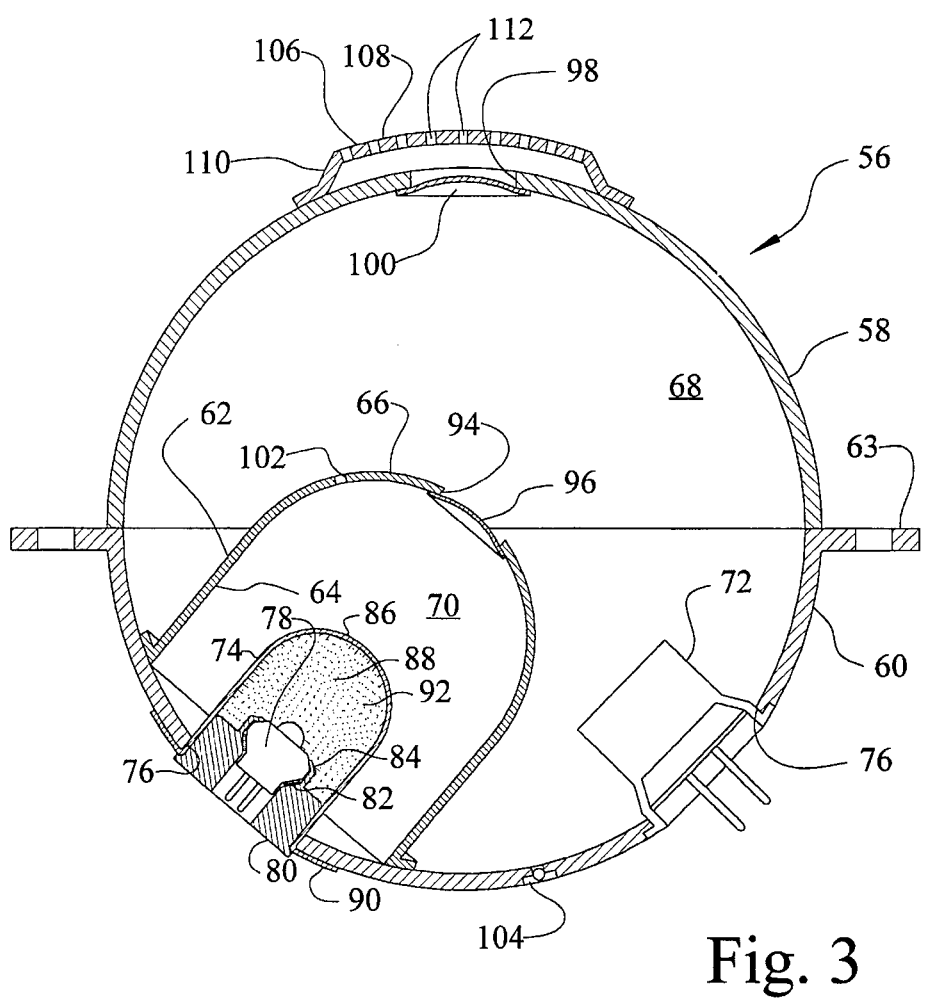
FIG. 3 is a cross-sectional side view of an inflator according to a second embodiment of the invention.

A second embodiment of the invention, which is suitable for driver side use, is shown in FIG. 3, and is generally designated by reference numeral 56.

The inflator 56 takes the general form of a sphere, and includes a housing including an upper hemisphere 58 and a lower hemisphere 60. These hemispheres are secured together, as by welding about their intersection. As shown, one or the other of the hemispheres may include a peripheral mounting flange 63 for securing the inflator to the vehicle.

Within the housing there is a divider wall 62. The wall 62 takes the general form of a dome, having a side wall 64 and a top wall 66. In the embodiment shown, the top wall is hemispherical, although other shapes, such as a disc, may be employed. Further, the entire divider wall may be formed as a section of a sphere, for reasons noted below. The side wall 64 is secured to the inner face of one of the upper or lower hemispheres 58 or 60. The side wall may be secured by forming a flat section (not shown) in the hemisphere (as by coining an annular plane) and welding the edge of the side wall to such a flat section. Preferably, however, the side wall includes a mounting flange about its lower end, and this flange is welded to the hemisphere. While an outward projecting flange is shown, an inward projecting flange could also be employed, and could be secured to the hemisphere by projection laser welding.

The divider wall separates the interior of the housing into first and second chambers 68 and 70, respectively. The first chamber is located outside of the divider wall, and the second chamber is located within the divider wall. Each chamber contains a quantity of the pressurized inert gas. As may be envisioned, the chambers may be entirely separate, such that the chambers may contain gas at different pressures if desired.

Within each chamber there is a heating device. As in the first embodiment, either or both of the heating devices may be pyrotechnic, self contained fluid fueled, etc. In the embodiment shown, first and second heating devices 72 and 74 are employed. Each device is mounted to the housing in a location within the appropriate chamber, such as through a mounting hole 76. Each heating device will include an appropriate electrical connector accessible from the exterior of the housing for connection to a controller (not shown) which provides signals to activate the heating devices and thus activate the inflator.

The heating device may take the form of a known pyrotechnic initiator 78, mounted to a holder 80. As is known in the art, such a holder will have a mounting surface 82 which mates with a portion of the initiator 78, and a crimp section 84 which will initially extend outward to permit placement of the initiator against the mating surface, and which is then crimped over to secure the initiator against the mating surface, as shown in FIG. 3. The holder may then be secured to the housing, such as by welding, to fix the heating device in position.

While this may be acceptable, many common initiators are formed of plastic, and would not withstand the pressure within the main chamber. As such, the stored inert gas in the main chamber would break the plastic initiator and the flow out through the resulting opening in holder 80. To prevent this, it is preferred that the heating devices be formed of rugged material which will withstand the pressure, or be isolated from the pressure, such as by a barrier shell 86. As shown, the barrier shell takes the form of a concave member formed of gas-impermeable material, such as metal, having an interior 88. In the preferred form, the shell takes the general form of a dome, or partial sphere, to better accept the pressure of the stored inert gas. The shell is placed over the initiator 78, and the holder 80 is placed in the mouth of the interior 88. The shell may then be welded to the housing to provide a gas-tight seal. This may be made easier by providing a mounting flange 90 about the mouth of the shell. This flange may then be welded (such as laser welding) to the housing.

As may be seen, this arrangement provides a gas-tight arrangement between the main chamber and the atmosphere, and isolates the initiator from the pressure in the associated chamber. However, the shell is interposed between the initiator and the main chamber, which would also interfere with heat transfer. To overcome this, the shell is formed as frangible (i.e., rupturable) upon activation of the initiator. In particular, the small amount of gas trapped in the interior 88 of the shell will increase in pressure due to the increased temperature upon activation of the initiator (together with any additional gas produced by the initiator itself). This increase in pressure will rupture the shell and permit the hot gasses to mix with the stored inert gas in the main chamber. It is noted that the connection between the holder and initiator is sufficiently gas-tight to permit the required pressure build-up in the short amount of time necessary for rupture. Further, the shell may include lines of reduced strength (typically reduced thickness) permitting more reliable rupture.

This arrangement is sufficient by itself for the heating device 74. However, to provide additional heat output, the arrangement shown provides further advantages. Specifically, the initiator 78 is located within the interior 88 of the shell. There is some amount of unused space in this interior, with the amount of course depending upon the relative sizes of the shell and initiator. This interior space may be filled with material 92 which will be ignited by the initiator, and thus provide increased heat output. The material 92 may be any known material which will provide the desired heat output and which is compatible with the initiator 78. For example, the material 92 may be a pyrotechnic material, such as Boron Potasuim Nitrate. Alternatively, the material may be a fluid fuel/oxidizer. As another example, the initiator may include the fluid fuel, and the material 92 may be an oxidizer, such as nitrous oxide.

As shown, the first heating device includes the shell while the second does not. Both heating devices may of course be provided with the shell as described for the first heating device. This is also the case for the embodiment of FIG. 1. In the embodiment shown in FIG. 3, the first initiator in the first volume is illustrated as larger than the initiator in the second volume. This may be due to the need for more heat to accommodate a larger volume of gas in the first chamber. Alternatively, the increased size may be due to a desire to heat the gas of the first chamber to an increased temperature, and therefore a higher pressure.

As in the first embodiment, the heated gas must escape the chambers, and preferably after reaching a predetermined pressure. The divider wall 62 is therefore provided with a vent port 94 with associated burst disc 96, and the upper hemisphere of the housing is provided with an exit port 98 and associated main burst disc 100. Also as in the first embodiment, activation of the heating devices causes heating of, and pressure increase in, the associated inert gas, with the burst disc(s) rupturing at the predetermined pressure. Further, either or both of the heating devices may be activated to produce the various outputs as in the previous embodiment.

One difference in operation from the first embodiment is that if both heating devices are activated, there must be a slight time delay between activation. This is because increased pressure in the first chamber will prevent rupturing of the burst disc 96. As such, the second chamber can not vent if the first chamber is at the predetermined pressure. This pressure in the first chamber decreases rapidly after rupture of the main disc 100, however, and the second heating device may be activated well in time to affect the pressure delivered to the cushion.

A second difference is that activation of the inflator would typically not consist solely of firing the second heating device. Specifically, since the second chamber opens onto the first chamber, simply firing the second heating device would cause the heated gas in the second chamber to flow into the first chamber. While this would heat the gas in the first chamber, the pressure would likely be lower than desired for proper cushion performance.

While the first and second chambers may be separate, it is preferred that the divider wall be provided with a restricted flow channel 102 extending therethrough. As in the first embodiment, the channel will cause the pressure in both chambers to equalize over "long" periods of time, but not over the "short" periods of time during activation. This also provides the venting feature to provide improved safety after deployment of the inflator. Use of the channel also permits a single fill valve 104, and low pressure detector (not shown) to be employed for both chambers.

As in the first embodiment, this inflator also employs a single exit for both chambers. While the exit could simply consist of the exit port and burst disc, it is preferred to provide a diffuser 106 to spread the inflation gas. As shown, the diffuser may simply consist of an outer wall 108 spaced from the associated hemisphere by a peripheral wall 110. A plurality of diffuser ports 112 may be provided in the outer wall 108 as show, or in the peripheral wall to provide a thrust neutral design. Alternatively, the diffuser may be a plate (not shown) having dimples formed about the peripheral edge such that the edge is sinuous. These dimples would then abut against the associated hemisphere to space the plate from the exit port, and the dimples could be welded to the hemisphere. The raised sections of the dimples would then form the diffuser ports.

As may be seen, this second embodiment provides the advantages of the first embodiment. The inflator permits various levels of output to act as an adaptive hybrid inflator. The use of a common fill valve, exit port, diffuser, low pressure detector, etc. reduces the number of components and thus saves weight and expense. This inflator also permits the automatic depressurization of the unused chamber.

In addition to these advantages, the second embodiment may be sized sufficiently small to permit installation in a steering wheel for protection of a vehicle driver. Specifically, the spherical shape of the inflator distributes stress evenly, permitting this spherical inflator to contain the stored gas at higher pressure compared to other shapes. Since the gas may be at higher pressure, the inflator may be smaller, and in particular small enough to mount to the steering wheel, yet still contain the proper amount of gas.

It is noted that this spherical inflator housing does have a substantial height compared to most driver side inflators. However, this height is only realized at the center, and rapidly lessens with radial distance outward. Further, the reduction in size permitted by the increased pressure limit allows the inflator to be mounted offset from the armature of the steering wheel (i.e., the steering wheel rotation axis). This typically permits the inflator to be mounted "deeper" in the steering wheel (i.e., further from the driver), thus reducing the amount which the inflator extends toward the driver.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An adaptive hybrid airbag inflator, comprising:

first and second chambers, each containing a quantity of stored pressurized inert gas, at least one of said chambers having an exit;

a first heating device operatively associated with said first chamber, a second heating device operatively associated with said second chamber; and a restricted flow channel providing limited gas communication between said two chambers.

2. An inflator as in claim 1, wherein said first and second chambers are defined within first and second pressure vessels, respectively, each of said pressure vessels including an exit orifice, and further including a connector having a central chamber and at least one exit port communicating with said central chamber, said pressure vessels being mounted to said connector with each of said exit orifices in communication with said central chamber; and a burst disc associated with each of said exit orifices and normally preventing flow of said stored gas from said pressure vessels into said central chamber, said restricted flow channel extending through said connector.

3. An inflator as in claim 2, wherein said connector is a connecting ring, and said exit orifices are in spaced, opposed relation.

4. An inflator as in claim 2, wherein each said burst disc is secured to said connecting ring in overlying relation to said central chamber.

5. An inflator as in claim 2, further comprising a diffuser surrounding said connecting ring.

6. An inflator as in claim 1, wherein said second chamber is within the confines of, and opens onto, said first chamber.

7. An inflator as in claim 6, wherein said first chamber is defined within a spherical housing, and said second chamber is defined within a divider wall mounted within said housing, said restricted flow channel extending through said divider wall.

8. An inflator as in claim 7, wherein said spherical housing is sized for placement upon a steering wheel of a vehicle.

9. A hybrid adaptive airbag inflator, comprising:
 a housing having an interior and an exit port communicating with said interior;
 a divider wall mounted within said housing and dividing said interior into first and second chambers, said divider wall including a vent port communicating with said first chamber, said exit port also communicating with said first chamber;
 a quantity of inert gas stored in each of said chambers;
 a heating device operatively associated with each of said chambers for heating an associated one of said quantities of stored gas upon receipt of a signal; and
 a burst disc associated with each of said exit port and vent port and normally preventing flow of said stored gas from an associated one of said chambers.

10. An inflator as in claim 9, wherein said housing is spherical, and sized for mounting upon a steering wheel of a vehicle.

11. An inflator as in claim 9, further including a diffuser mounted over said exit port.

12. An inflator as in claim 9, further including a restricted flow channel extending through said divider wall.

13. An inflator as in claim 12, further including a fill valve communicating with one of said chambers.

* * * * *

UNITED STATES PATENT AND TRADEMARK OFFICE
CERTIFICATE OF CORRECTION

PATENT NO. : 5,582,428
DATED : December 10, 1996
INVENTOR(S) : Eric S. Buchanan, Bradley W. Smith and Mark B. Woodbury It is certified that error appears in the above-indentified patent and that said Letters Patent is hereby corrected as shown below:

Title page, item [56]: References Cited, "Frautom et al." should be --Frantom et al.--.

and

"Giovanotti" should be --Giovanetti--.

Signed and Sealed this

Twelfth Day of August, 1997

Attest:

BRUCE LEHMAN

Attesting Officer

Commissioner of Patents and Trademarks